US006275472B1

(12) United States Patent
Yamaguchi et al.

(10) Patent No.: US 6,275,472 B1
(45) Date of Patent: Aug. 14, 2001

(54) METHOD AND APPARATUS FOR ACHIEVING PASS CONTROL OF TRANSMISSION CELLS

(75) Inventors: Tomoyuki Yamaguchi; Naoki Aihara, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/016,457

(22) Filed: Jan. 30, 1998

(30) Foreign Application Priority Data

Sep. 9, 1997 (JP) .................................................. 9-243880

(51) Int. Cl.[7] ........................... H04L 12/26; H04L 12/28; H04L 12/56
(52) U.S. Cl. ............................................ 370/252; 370/395
(58) Field of Search ..................................... 370/230, 229, 370/234, 235, 236, 252, 253, 395, 465, 468, 389, 471, 907

(56) References Cited

U.S. PATENT DOCUMENTS

| 5,519,689 | * | 5/1996 | Kim ....................... 370/232 |
| 5,568,486 | * | 10/1996 | Huscroft et al. ....................... 370/395 |
| 5,668,798 | * | 9/1997 | Toubol et al. ....................... 370/230 |
| 5,784,358 | * | 7/1998 | Smith et al. ........................... 370/230 |
| 5,875,192 | * | 2/1999 | Cam et al. ........................... 370/474 |
| 5,914,954 | * | 6/1999 | Nakayama ........................... 370/394 |
| 5,920,563 | * | 7/1999 | Fukui et al. ........................... 370/395 |
| 5,974,045 | * | 10/1999 | Ohkura et al. ........................ 370/395 |

FOREIGN PATENT DOCUMENTS

| 5191439 | 7/1993 | (JP) . |
| 6132970 | 5/1994 | (JP) . |

OTHER PUBLICATIONS

Uyless Black, ATM Foundation for Broadband Networks, vol. 1, pp. 122–124, 1995.*

* cited by examiner

Primary Examiner—Chau Nguyen
Assistant Examiner—Phuongchau Ba Nguyen
(74) Attorney, Agent, or Firm—Helfgott & Karas, P.C.

(57) ABSTRACT

An apparatus for pass control of transmission cells for preventing cells having headers including a specific pattern of multi-bit error from being erroneously transmitted. The pass control apparatus is operated by a method comprising (i) a step of monitoring a communication quality of each received frame; (ii) a step of temporarily buffering one monitored frame's worth of cells for each frame; (iii) a step of determining whether or not the communication quality of the monitored frame exceeds a predetermined threshold level; and (iv) a step of erasing all of the cells including one-bit error and multi-bit error in their headers from one frame's worth of buffered cells when the communication quality deteriorates exceeding the predetermined threshold level, while passing the buffered cells as they are when it does not exceed the threshold level.

11 Claims, 16 Drawing Sheets

| ERROR BITS (HEC BYTE) | OPERATION OF CORRECTION |
|---|---|
| 0-1-2 | 1 BIT ERROR CORRECTION OF BIT 0 IN 4th BYTE (CLP) |
| 1-2-3 | 1 BIT ERROR CORRECTION OF BIT 1 IN 4th BYTE (PTI) |
| 2-3-4 | 1 BIT ERROR CORRECTION OF BIT 2 IN 4th BYTE (PTI) |
| 3-4-5 | 1 BIT ERROR CORRECTION OF BIT 3 IN 4th BYTE (PTI) |
| 4-5-6 | 1 BIT ERROR CORRECTION OF BIT 4 IN 4th BYTE (VCI) |
| 5-6-7 | 1 BIT ERROR CORRECTION OF BIT 5 IN 4th BYTE (VCI) |

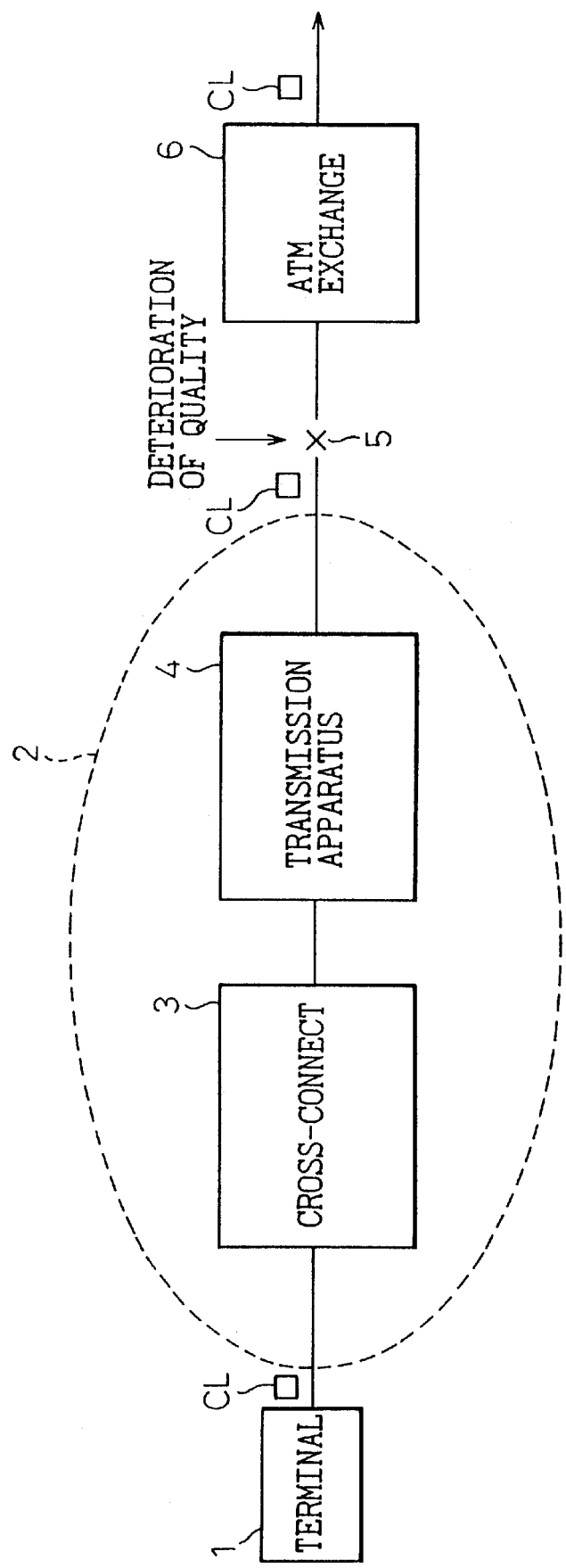

METHOD AND APPARATUS FOR ACHIEVING PASS CONTROL OF TRANSMISSION CELLS

BACKGROUND OF THE INVENTION

1. Field of the Invention

The present invention relates to a method and apparatus for pass control of transmission cells.

In a broadband integrated service digital network (B-ISDN), cells composed of so-called "fixed length packets" are transmitted. This B-ISDN is constructed by various types of cell processing apparatuses, for example, an asynchronous transfer mode (ATM) exchange, transmission apparatus, cross-connect apparatus, and ATM-local area network (LAN) equipment. The above cells are input to these cell processing apparatuses as transmission cells, subjected to predetermined processing, and then output.

The present invention will discuss the pass control of transmission cells as one of the predetermined processing. Pass control is a control, when the cell processing apparatus detects transmission cells including a bit error or errors, for not allowing such cells to pass through a cell processing apparatus but, for example, discarding them.

2. Description of the Related Art

As will be explained in detail later by using the drawings, in an ATM exchange, ATM cells are extracted at each individual part constituting an input/output division of the ATM exchange. In the extraction of the ATM cells, first cell synchronization is established by a synchronizing field mapped in a header of each ATM cell. A typical synchronizing field is a header error control (HEC) field.

The value written in the HEC field is the result of a cyclic redundancy check (CRC) calculation on the 5 bytes (5 octets) comprising the header. When a specific pattern of a multi-bit error occurs in the header, however, this multi-bit error is erroneously recognized as a one-bit error. Occurrence of such an erroneous recognition is inherent to the above CRC calculations and cannot be avoided. Note that a detailed example of the specific pattern causing the erroneous recognition will be explained later.

When a specific pattern of the multi-bit error occurs, the transmission cells must be discarded without passing through the cell processing apparatus. However, because of the characteristics of CRC calculation, the specific pattern of the multi-bit error is erroneously recognized as one-bit error as mentioned above and the cells pass through the cell processing apparatus. This is because, under an HEC synchronizing algorithm using CRC calculation, a header deemed to include one-bit error therein, regardless of the fact that this is a pseudo one-bit error, is rewritten to a header having a bit corrected at that error bit position, and the transmission cells are then sent again onto the lines.

The problem is that such a cell including an error in its header exerts a greater influence upon the reliability of the communication system than a cell including error in its payload. This is because error included in the payload can be easily recovered by a request for retransmission from the terminal of destination subscribers of the cells, but when the error is included in the header, for example, the cell in question is transferred to the other unrelated subscribers, the cell with a high priority is discarded first at the time of congestion of traffic during transmission, and other similar situations are caused.

SUMMARY OF THE INVENTION

Accordingly, an object of the present invention is to provide a method and apparatus for pass control of transmission cells capable of preventing transmission cells including a bit error or errors in the header, which cells should be discarded in the cell processing apparatus, from passing through the cell processing apparatus.

To attain the above object, the present invention provides a method comprising a step of monitoring the communication quality of each received frame; a step of temporarily buffering one monitored frame's worth of cells for each frame; a step of determining whether or not the communication quality of the monitored frame exceeds a predetermined threshold level; and a step of erasing all of the cells including one-bit error or multi-bit error in the header from among the one frame's worth of buffered cells when the communication quality deteriorates exceeding the predetermined threshold level and passing the buffered cells as they are when the communication quality does not exceed the threshold level. By this, in the pass control apparatus of transmission cells, erroneous transmission of cells having a header including a specific pattern of multi-bit error is prevented.

BRIEF DESCRIPTION OF THE DRAWINGS

The above object and features of the present invention will be more apparent from the following description of the preferred embodiments with reference to the accompanying drawings, wherein:

FIG. 7 is a view explaining an error bit pattern in a HEC field which causes a pseudo one-bit error;

FIG. 16 is a view illustrating an example of a communication system to which the present invention is applied.

DESCRIPTION OF THE PREFERRED EMBODIMENTS

Figure 1:
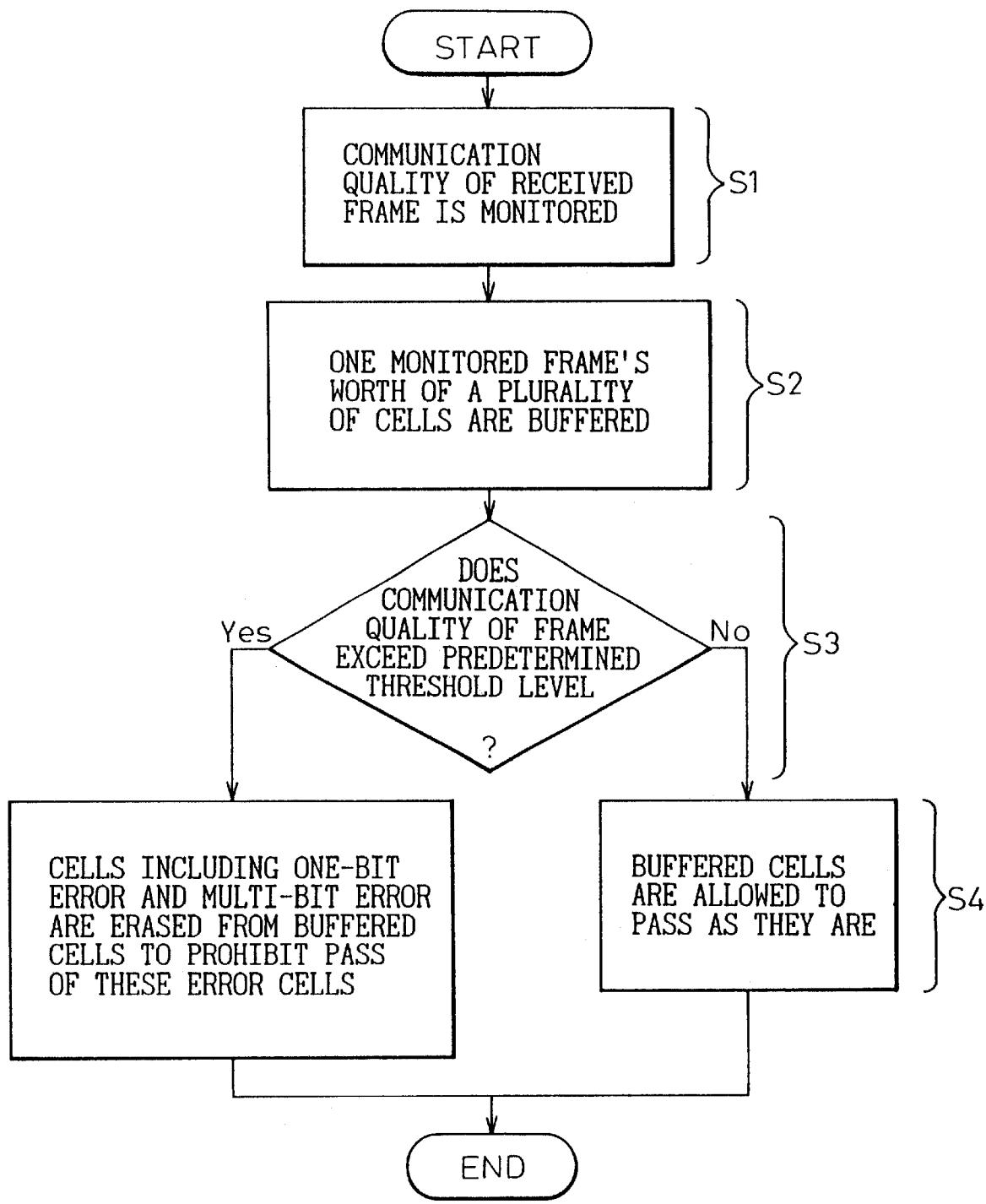
FIG. 1 is a view of the basic steps of a method of pass control of transmission cells according to the present invention.

Before describing the embodiments of the present invention, the related art and the disadvantages therein will be described with reference to the related figures.

FIG. 16 is a view illustrating an example of the communication system to which the present invention is applied. In the figure, 1 is a terminal of subscribers. Cells CLs are transmitted from the terminal 1 via a transmission network 2, or cells CLs are transmitted to the terminal 1. Cells transmitted via the transmission network 2 are transferred to the terminal of another subscriber (not illustrated) by switching by an exchange 6, for example, an ATM exchange.

The transmission network 2 is for example a synchronous optical network (SONET) or synchronous digital hierarchy (SDH) network. In this transmission network 2, a cross-connect apparatus 3 and a transmission apparatus 4 are disposed. The following explanation will be made taking as an example an ATM exchange 6 among various types of cell processing apparatuses. More concretely, the explanation will be made taking as an example individual parts among a switch unit, common parts, and individual parts constituting this ATM exchange 6. As is well known, the individual parts function for termination of a physical layer in the ATM exchange 6, terminate the SONET frame or SDH frame, and extract ATM cells.

In the extraction of ATM cells, as mentioned above, cell synchronization is first established by a synchronizing field mapped in the header of the cells. A typical synchronizing field is an HEC field. By this HEC, cell synchronization is established using a predetermined cell synchronizing algorithm. That is, the initial position of each cell can be found from among the frames. Note this matter is well known.

By using the HEC field as the synchronizing field, the above cell synchronization can be established. Further, there is another advantage produced by using this HEC field. The advantage is that if a bit error or bit errors occur in the header of a cell, the error or errors can be detected by the CRC calculation function. Such bit error can be detected both at the time of one-bit error and two or more bits of error, that is, multi-bit error. More preferably, if one-bit error, it is possible to detect at which bit position in the header the error occurs, therefore bit error in the header can be corrected to a correct bit at the time of one-bit error. Note that this matter is also well known.

The above one-bit error and multi-bit error frequently occur due to deterioration of the transmission quality on for example lines. An "x" mark 5 in FIG. 16 shows the position of deterioration of quality.

As explained above, the value written in the HEC field is the result of a CRC calculation on the 5 bytes (5 octets) comprising the header. When a specific pattern of a multi-bit error occurs in the header, however, this multi-bit error is erroneously recognized as a one-bit error. Occurrence of such an erroneous recognition is inherent to the above CRC calculations and cannot be avoided. Note that a detailed example of the specific pattern causing the erroneous recognition will be explained later with reference to the accompanying figures.

As already explained further, when a specific pattern of the multi-bit error occurs, the transmission cells must be discarded without passing through the cell processing apparatus. However, because of the characteristics of CRC calculation, the specific pattern of the multi-bit error is erroneously recognized as one-bit error as mentioned above and the erroneously recognized cells pass through the cell processing apparatus. This is because, under an HEC synchronizing algorithm using CRC calculation, a header deemed to include one-bit error, regardless of the fact that this is a pseudo one-bit error, is rewritten to a header having a bit corrected at that error bit position, and the transmission cells are then sent again onto the lines.

Again, the problem is that such a cell including an error in its header exerts a greater influence upon the reliability of the communication system (FIG. 16) than a cell including error in its payload. This is because error included in the payload can be easily recovered by a request for retransmission from the terminal of destination subscribers of the cells, but when the error is included in the header, for example, the cell in question is transferred to the other unrelated subscribers, the cell with a high priority is discarded first at the time of congestion of traffic during transmission, and other similar situations are caused.

The present invention provides a method and apparatus for pass control of transmission cells capable of preventing transmission cells including a bit error or errors in the header, which cells should be discarded in the cell processing apparatus, from passing through the cell processing apparatus.

FIG. 1 is a view of the basic steps of a method of pass control of transmission cells according to the present invention. The control procedure on which this pass control method is based is described below:

Namely, in this procedure, (i) frames in which are mapped a plurality of cells each partially including a synchronizing field are sequentially received at a cell processing apparatus and frame synchronization is established;

(ii) establishing a synchronization with respect to cells while correcting one-bit error in the header of a cell and discarding cells including multi-bit error of 2 bits or more; and (iii) cells extracted from each frame are passed through the cell processing apparatus.

Here, the pass control method of the present invention is characterized by the following four steps S1 to S4. Namely, (1) Step S1: Step of monitoring the communication quality of each received frame.

(2) Step S2: Step of temporarily buffering the one monitored frame's worth of cells for each one frame.

(3) Step S3: Step of determining whether or not the communication quality of the monitored frame exceeds a predetermined threshold level.

(4) Step S4: Step of erasing all cells including one-bit error and multi-bit error in a header from one frame's worth of buffered cells and prohibiting cells from passing through the cell processing apparatus when the communication quality is deteriorated exceeding the predetermined threshold level, while allowing the one frame's worth of buffered cells to pass as they are when the communication quality does not exceed the threshold level.

Figure 2:
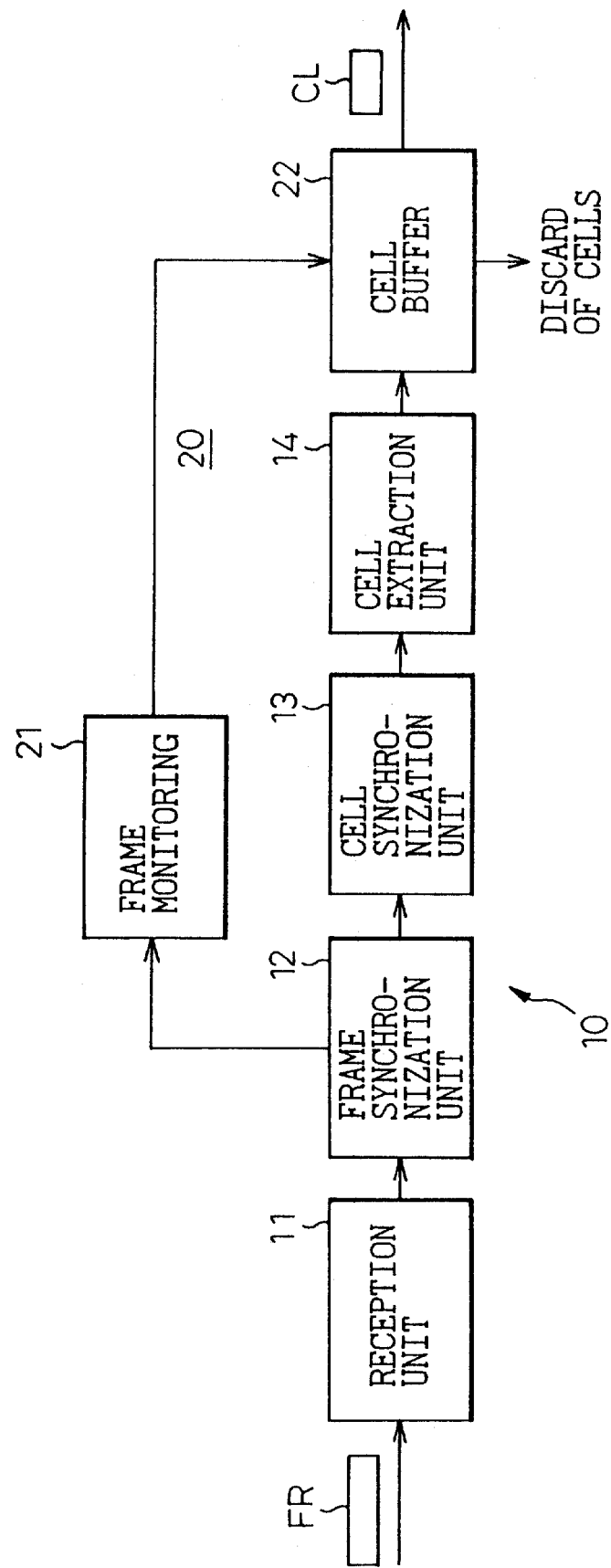
FIG. 2 is a view of the basic configuration of an apparatus for pass control of transmission cells according to the present invention.

FIG. 2 is a view of the basic configuration of an apparatus for pass control of transmission cells according to the present invention. First, an explanation will be made of the cell processing apparatus to which this pass control apparatus is to be added.

This cell processing apparatus 10 comprises a reception unit 11, a frame synchronization unit 12, a cell synchronization unit 13, and a cell extraction unit 14.

The reception unit 11 sequentially receives frames FRs transmitted from the lines.

The frame synchronization unit 12 establishes the frame synchronization of the received frames FRs.

The cell synchronization unit 13 establishes cell synchronization while detecting bit error and correcting the same for cells mapped in the frames FRs after establishing the frame synchronization.

The cell extraction unit 14 extracts the cells after establishing cell synchronization.

The pass control apparatus 20 of transmission cells according to the present invention is designed to be added to the cell processing apparatus 10 and, as illustrated, comprises a frame monitoring means 21 and a cell buffer 22.

The cell buffer 22 is connected to the latter stage of the cell extraction unit 14 and temporarily stores the one frame's worth of cells contained in each frame FR.

The frame monitoring means 21 is connected to the frame synchronization unit 12 and monitors the communication quality of each frame FR.

Here, when it is determined by the frame monitoring means 21 that the communication quality of the frame FR has deteriorated exceeding the predetermined threshold level, the cells including the bit error are all discarded from the cell buffer 22.

The method and apparatus for pass control of transmission cells according to the present invention are produced from the following viewpoint.

That is, when it is decided that there is a high probability that the one-bit error is a pseudo one-bit error due to erroneous recognition, the transmission of cells, assumed to include this pseudo one-bit error from the cell buffer 22, is prohibited. By this, cells including bit error in their headers are not transmitted to the lines of the latter stage regardless of whether the error is a one-bit error or multi-bit error.

In this case, it cannot be determined whether the one-bit error is a pseudo one-bit error or true one-bit error. Accordingly, if the one-bit error is really a true one-bit error, it can be allowed to pass as a normal cell by the one-bit error correction function by a CRC calculation. It appears disadvantageous in this point. However, compared with such a disadvantage, the disadvantage of a cell including a bit error in the header being transmitted to the line of the other party and thereby the reliability of the communication system being lost, is considerably larger. Whether the cell has a header including a true one-bit error or the cell has a header including a pseudo one-bit error, the opposite subscriber can just recover the error by requesting retransmission or the like for the untransmitted cells if necessary.

Figure 3:
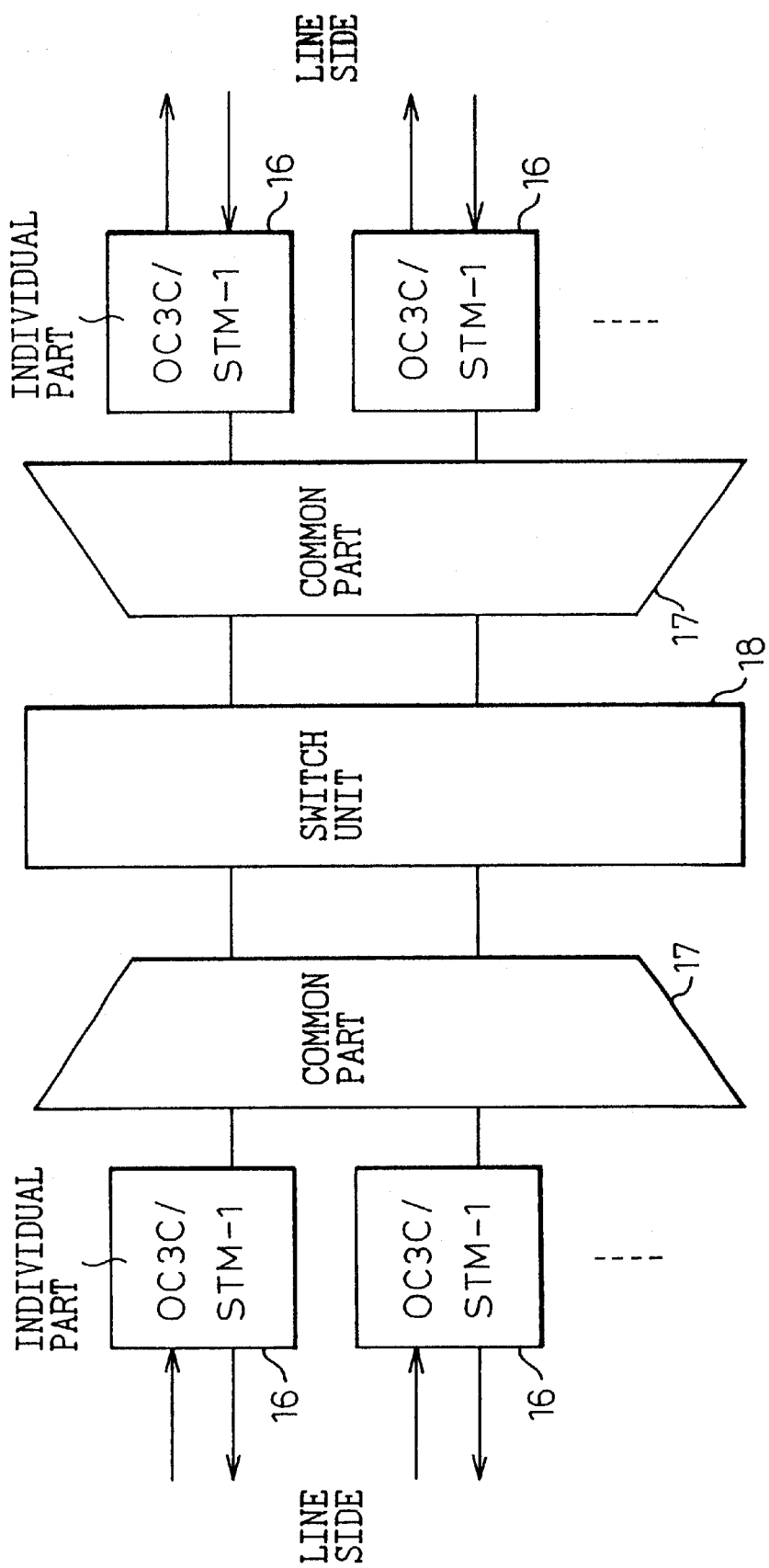
FIG. 3 is a view of a representative example of a cell processing apparatus to which the present invention is applied.

FIG. 3 is a view of a typical example of a cell processing apparatus to which the present invention is applied. In the figure, the individual part 16 (only four are shown for simplification) is the above typical example to which the present invention is applied.

The configuration shown in the present figure is that of the exchange 6 shown in FIG. 16, for example, an ATM exchange.

The ATM exchange 6 may be roughly divided into an individual part 16, a common part 17, and a switch unit 18. Each individual part 16 is a physical layer termination part in an ATM communication system and is also referred to as a line corresponding part. The part 16 includes an OC3C (optical carrier level 3 signal concatenated), OC12C, etc. in a SONET network, an STM-1 (synchronous transport module-level 1) and STM-4 in an SDH network, and, in addition, a DS3 (digital signal 3), DS1, and so on. In the example of the figure, OC3C or STM-1 is shown.

The individual part 16, particularly an OC3C or STM1, is a line interface having a line speed of 155.52 bps. The main object thereof is to terminate a SONET or SDH frame and extract the ATM cells (corresponding to the cell extraction unit 14 of FIG. 2).

The common part 17 connected to the individual part 16 (OC3C/STM-1) concentrates a maximum of 16 channels from the individual part 16 and connects them to the switch unit 18. The switch unit 18 switches the cell groups in accordance with the header information written in the header of each cell.

Figure 4:
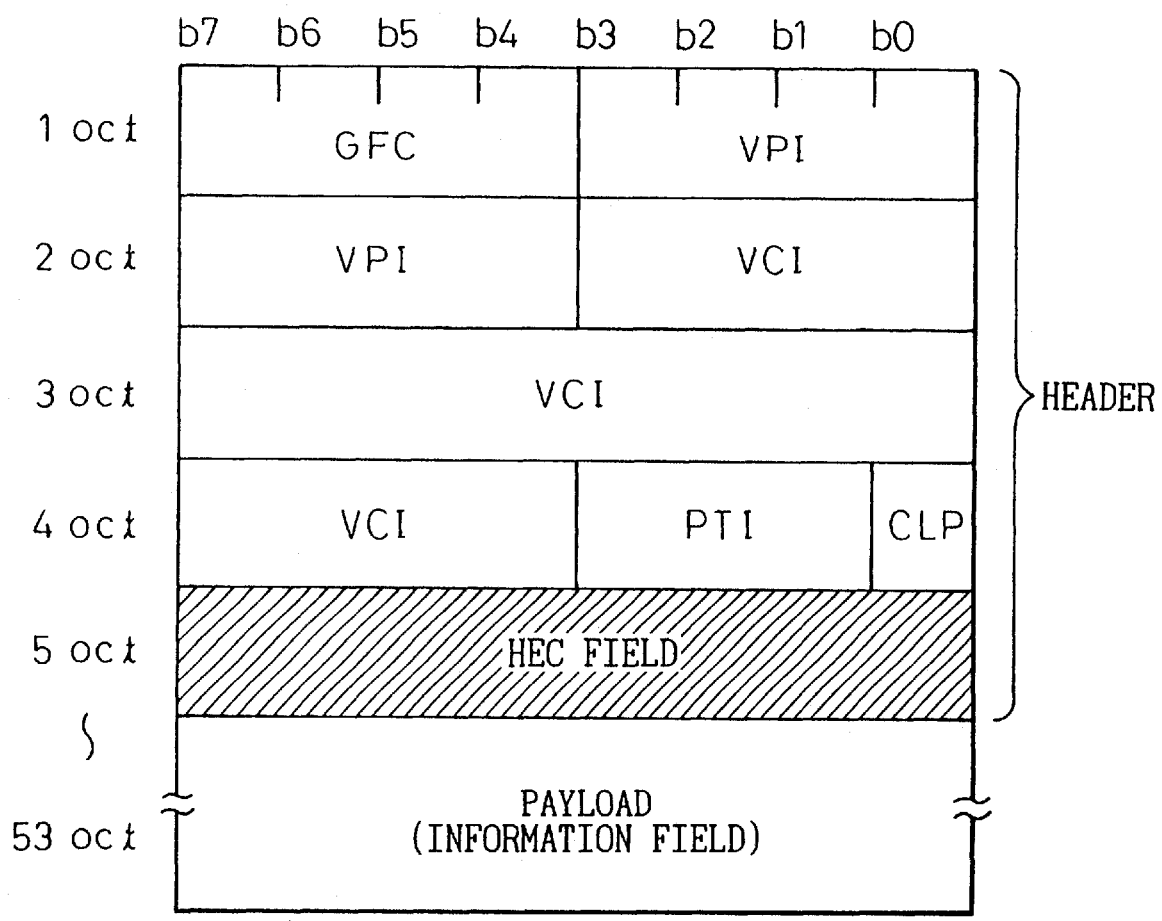
FIG. 4 is a view explaining the configuration of a header.

FIG. 4 is a view explaining the configuration of the header. Note that the figure shows the format of an entire ATM cell including the header.

The ATM cell 19 comprises a header from a first octet (1 oct) to the fifth octet (5 oct) and a payload up to the 53rd octet (53 oct).

The header comprises fields as is well known. These include a general flow control (GFC), virtual path identifier (VPI), virtual channel identifier (VCI), payload type identifier (PTI), cell loss priority (CLP), and the already mentioned HEC.

The present invention relates to the synchronizing field in the header of a cell as mentioned above. A specific example of this synchronizing field is the above HEC field. This HEC shows the result by the CRC calculation. Cell synchronization is established while executing the status transition between the correction mode and detection mode by using this calculation result.

Figure 5:
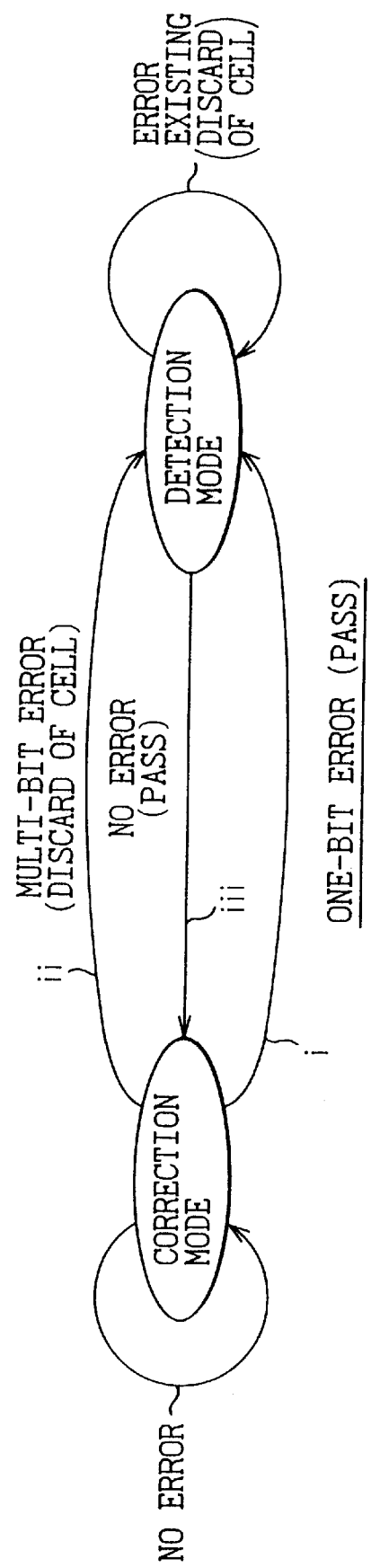
FIG. 5 is a view illustrating the mode transitions occurring during establishment of cell synchronization by HEC.

FIG. 5 is a view illustrating the mode transition occurred during the establishment of cell synchronization by HEC.

First, assume that the cell synchronization operation is in the correction mode. In this correction mode, when it is decided by the result of the CRC calculation that there is no bit error, this mode is repeatedly maintained ("NO ERROR").

In this correction mode, when it is decided by the result of the CRC calculation that there is one-bit error, the mode enters the detection mode via a path i. Then, in this detection mode, the one-bit error is corrected. The mode then returns to the original correction mode via a path iii. At this time, when the cell including no bit error is received, the ATM cell passes through the individual part 16 ("PASS" in the figure) and reaches the common part 17.

Next, assume that multi-bit error of 2 bits or more is detected in the correction mode. The mode enters the detection mode via a path ii. Then, in this detection mode, the ATM cell is prohibited from passing through the individual part 16 and is then discarded ("CELL DISCARD").

Here, the problem resides in the mode transition via the path i in FIG. 5. Namely, in this mode transition, there are <1> cells passed due to true one-bit error and <2> cells passed due to pseudo one-bit error and it is impossible to discriminate between them. The latter case exerts an adverse influence upon the reliability of the communication system as mentioned above. Below, the latter case will be analyzed in a little more detail.

Figure 6:
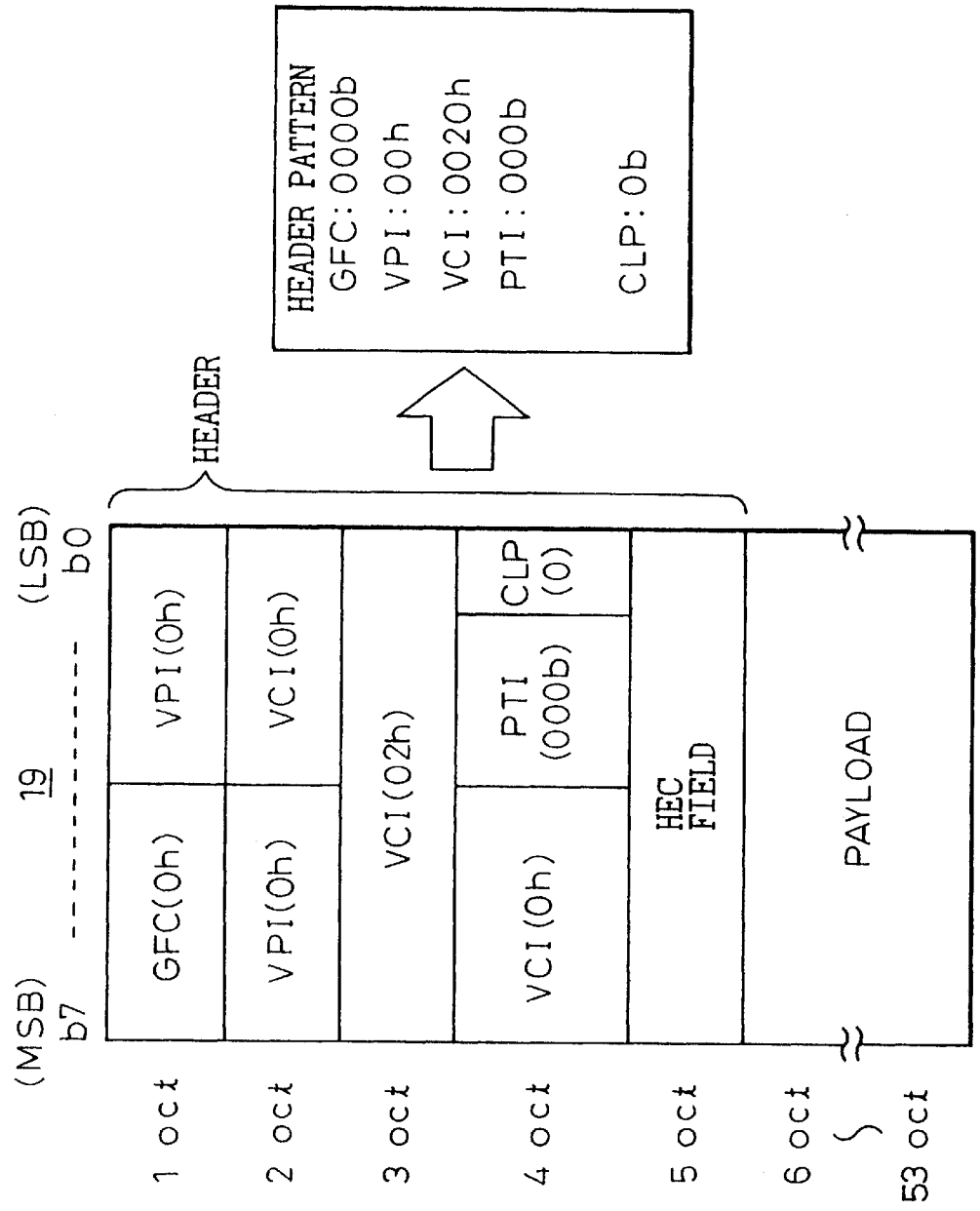
FIG. 6 is a view explaining a header pattern which causes a pseudo one-bit error.

FIG. 6 is a view explaining the header pattern by which a pseudo one-bit error is caused. The left part of the figure is as explained in FIG. 4.

Assume that the bit pattern of the header in the left part (header pattern) is the pattern in the right part of FIG. 6. Note that "b" in the figure means "binary", and "h" means "hexadecimal".

Further, assume that a multi-bit error of 3 bits or more occurs in the HEC field (left part). (Note that, in a multi-bit error of 2 bits, there is none of the problematic pseudo one-bit error).

FIG. 7 is a view explaining the error bit pattern of the HEC field which causes a pseudo one-bit error. Namely, it shows a concrete example of the error bit which causes the erroneous correction of bits.

In the figure, 0-1-2, 1-2-3, etc. of the left end represent (the initial bit (b0), first bit (b1), second bit (b2)) and (first bit (b1), second bit (b2), third bit (b3)) of the HEC field, respectively. Looking at the first row, assume that the (b0, b1, b2) bits of the HEC pattern should be (1, 1, 0), but it becomes (0, 0, 1) due to the deterioration of the communication quality. When, as illustrated, such a 3-bit error occurs, the operation for correction with respect to this error erroneously recognizes that there is an error of 1 bit at the initial bit b0 in the CLP of the 4th byte (4 oct) and corrects the 1 bit error (b0) by the inherent function of the CRC calculation. Accordingly, although originally there is no error in the 1 bit b0 in the CLP, the bit is inverted. Here, CLP becomes erroneous.

Similarly, if there is an error in each continuous 3 bits of the left end of FIG. 7, PTI and VCI are rewritten to erroneous information even though they were originally correct.

The present invention solves this problem taking note of the above. Namely, when the possibility of occurrence of a pseudo one-bit error due to 3-bit error as shown in FIG. 7 is large, ATM cells including such 3-bit error are compulsorily discarded.

In order to decide whether or not the possibility of occurrence of a pseudo one-bit error is large, in the present invention, the communication quality of the frame FR is monitored. For this purpose, the bit error rate (BER) is monitored.

Figure 8A:
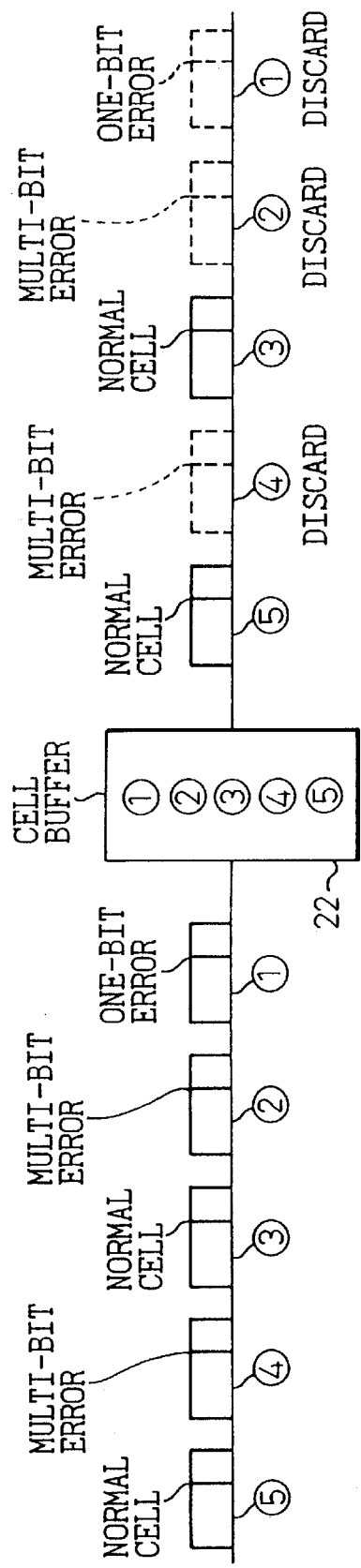
FIGS. 8A and 8B illustrate control for passing cells according to the present invention.
Figure 8B:
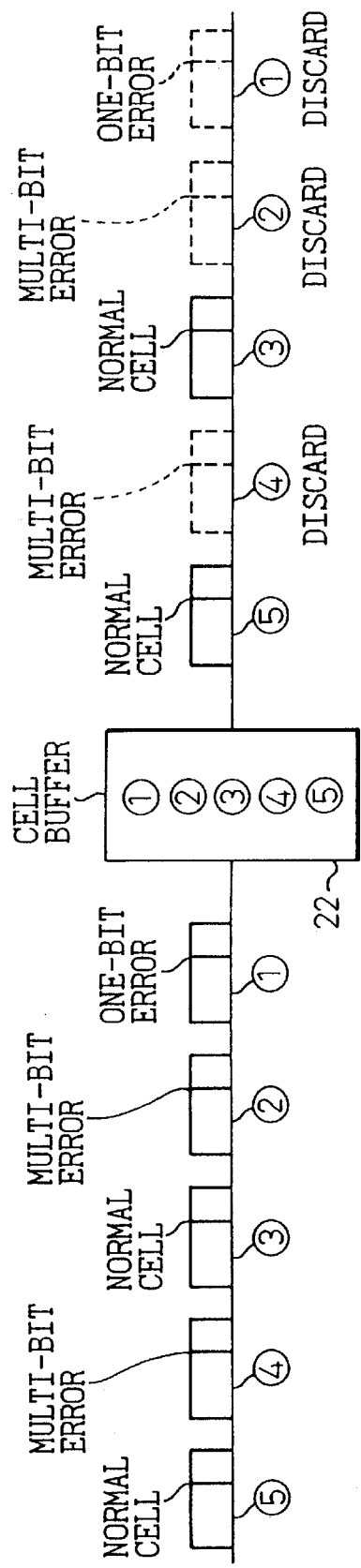

FIGS. 8A and 8B illustrate the pass control of cells according to the present invention, in which FIG. 8A is a view of the case where BER exceeds the predetermined threshold level; and FIG. 8B is a view of the case where BER does not exceed the predetermined threshold level. The threshold level in this case is for example $10^{-3}$. Note that this may be made $10^{-2}$ or $10^{-4}$ according to the quality required by the user.

First, referring to FIG. 8A and FIG. 8B, assume that one frame's (FR) worth of cells including one-bit error→cells including multi-bit error→normal cells→cells including multi-bit error→normal cells→ . . . are successively temporarily stored in the cell buffer 22.

In the case of FIG. 8B, that is, when the communication quality of the frame FR is good, as shown at the right side of the cell buffer 22 of FIG. 8B, pass control of cells is carried out. Cells indicated by a dotted line are cells which are discarded at the individual part 16.

Cells including multi-bit error are usually discarded in most cases, but in the case of the specific pattern shown in FIG. 6 and FIG. 7, the multi-bit error is erroneously recognized as one-bit error, and a cell having erroneously corrected header passes through the individual part 16.

The correction operation of FIG. 8B is carried out also in the related art, but in the present invention, the correction operation of FIG. 8A is added. In FIG. 8A, BER becomes $10^{-3}$ or more and the communication quality of the frame is deteriorated.

When comparing the case of FIG. 8A and the case of FIG. 8B, the case of FIG. 8A is different from FIG. 8B in the point that all of the cells including multi-bit error are discarded unconditionally and the point that cells including one-bit error are also all discarded. As a result, when the communication quality of the frame FR deteriorates (FIG. 8A), the cells are discarded deeming that one-bit error can include pseudo one-bit error due to erroneous recognition.

In the case of FIG. 8B, when cells including multi-bit error correspond to FIG. 6 and FIG. 7, the problem that they are erroneously recognized as one-bit error, are corrected, and pass through the individual part 16 remains even in the present invention. However, the case of FIG. 8B is a case where BER<$10^{-3}$, that is, the communication quality of the frame FR is good, therefore, the probability of occurrence of such a multi-bit error erroneously recognized as one-bit error in HEC is extremely low, so there is almost no problem in practice.

Figure 9:
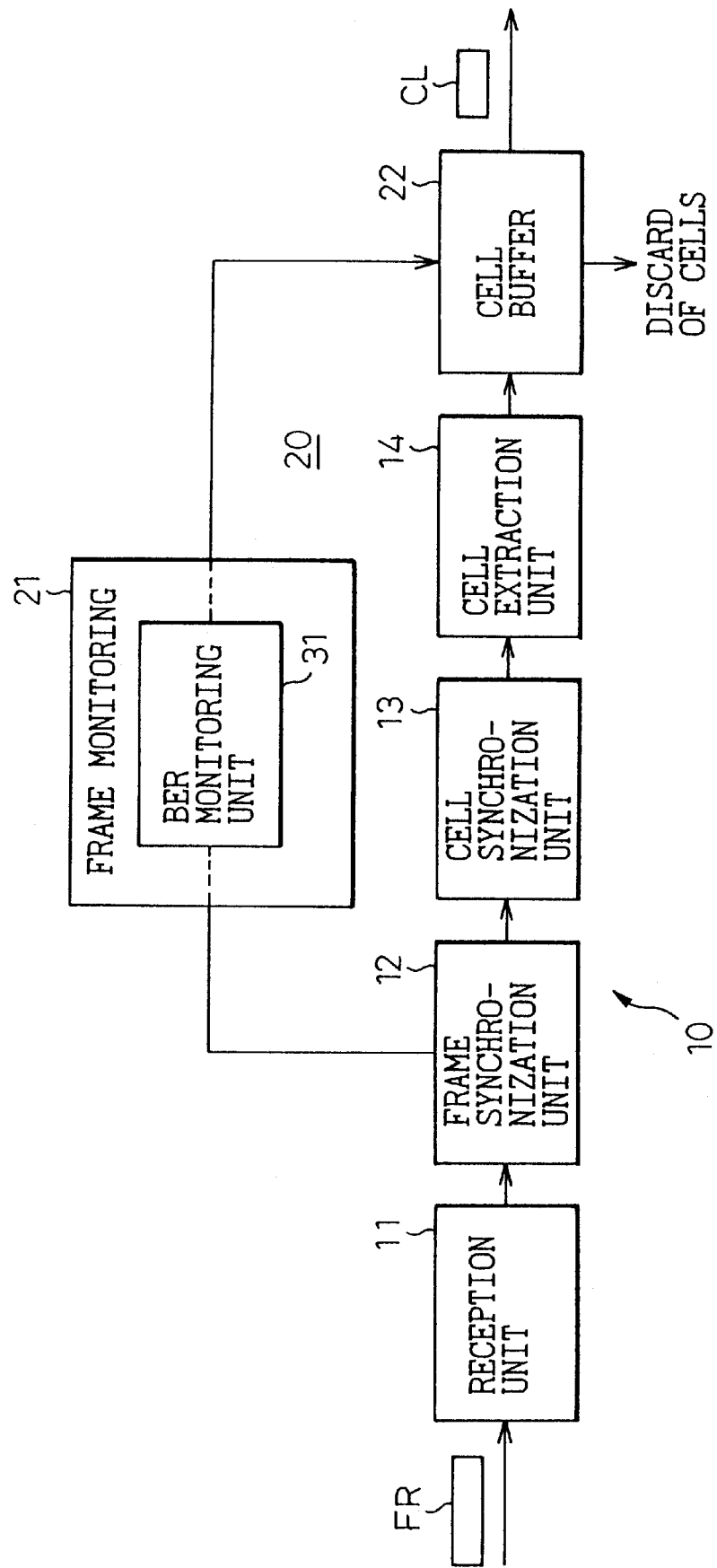
FIG. 9 is a view of an embodiment of an apparatus for pass control of transmission cells based on the present invention.

FIG. 9 is a view of an embodiment of an apparatus for pass control of transmission cells according to the present invention and corresponds to FIG. 2. In this embodiment, a BER monitoring unit 31 is introduced into the frame monitoring means 21 in FIG. 2. This BER monitoring unit 31 selects the pass control shown in FIG. 8A or FIG. 8B.

Figure 10:
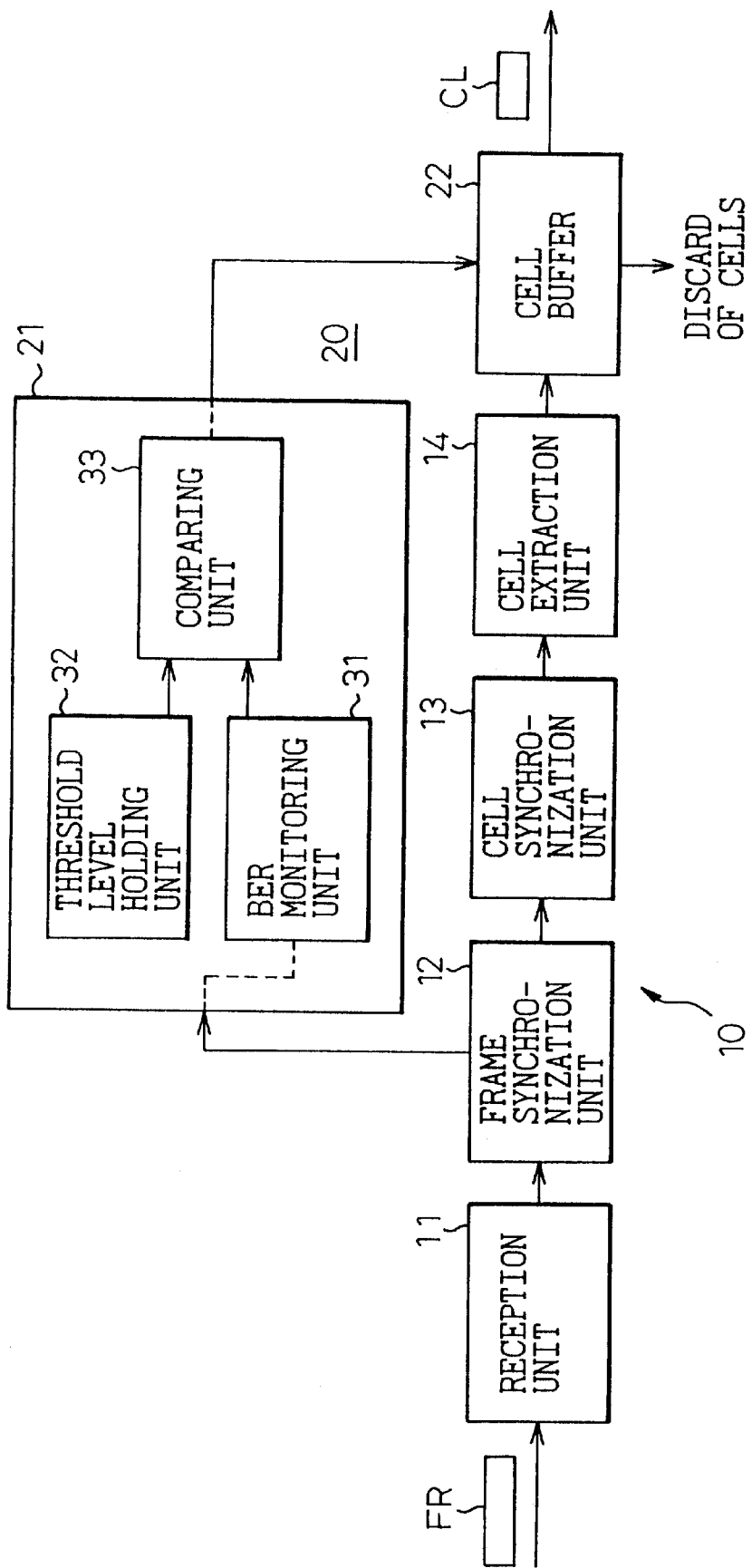
FIG. 10 is a view of the embodiment shown in FIG. 9 in further detail.

FIG. 10 is a more detailed view of the embodiment shown in FIG. 9. First, the frame monitoring means 21 includes a threshold level holding unit 32 for holding the predetermined threshold level of BER.

The frame monitoring means 21 further includes a comparing unit 33 for comparing the BER value monitored by the BER monitoring unit 31 with the threshold level held in the threshold level holding unit. Here, when the BER value deteriorates exceeding the threshold level thereof, cells including bit error are all discarded from the cell buffer 22.

Figure 11:
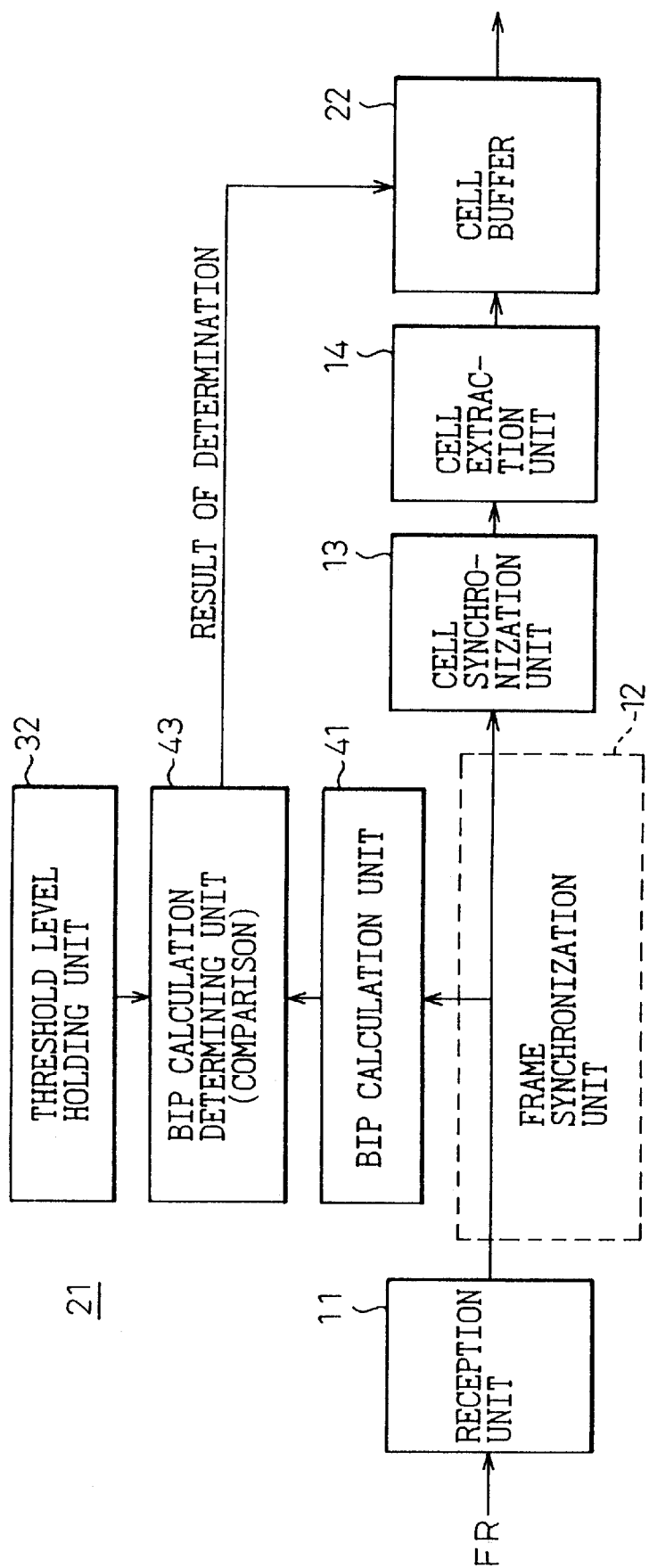
FIG. 11 is a view of an embodiment of a frame monitoring means 21 shown in FIG. 10.

FIG. 11 is a view of a more detailed example of the frame monitoring means 21 shown in FIG. 10. The BER monitoring unit 31 of FIG. 10 is realized by bit interleaved parity (BIP) calculation. For this purpose, a BIP calculation unit 41 and a BIP calculation determining unit (comparing unit) 43 are used. The operation of the apparatus of FIG. 11 is as follows.

Figure 12:
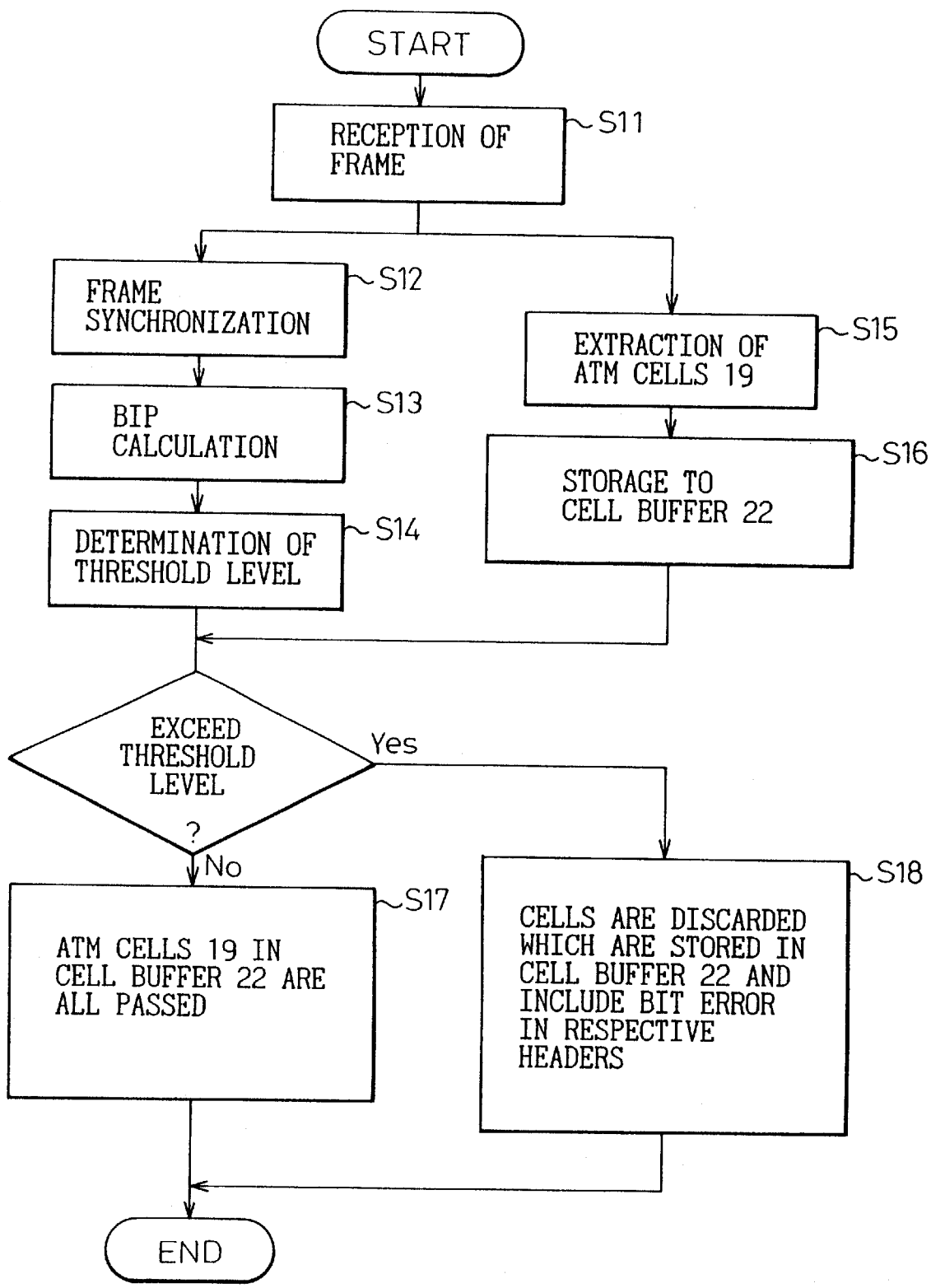
FIG. 12 is a flowchart for explaining the operation of the apparatus shown in FIG. 11.

FIG. 12 is a flowchart for explaining the operation of the apparatus shown in FIG. 11.

Step S11: The reception unit 11 receives the frame FR.

Step S12: The frame synchronization unit 12 establishes frame synchronization.

Step S13: The BIP calculation unit 41 performs BIP calculation with respect to one series of received frames for which frame synchronization is established.

Step S14: It is determined whether or not the BIP calculation value exceeds a threshold level, as a reference, using the threshold level (for example $10^{-3}$) held at the threshold level holding unit 32.

Step S15: In parallel to steps S12 to S14, ATM cells 19 are extracted via the cell synchronization unit 13 and the cell extraction unit 14.

Step S16: One frame's worth of extracted ATM cells are stored in the cell buffer 22.

Step S17: When it is determined by the determination of step S14 that the BIP calculation value does not exceed the threshold level (see FIG. 8B), all ATM cells 19 in the cell buffer 22 are allowed to pass. Note that the cell buffer 22 stores both ATM cells including already corrected headers where true one-bit error is corrected and ATM cells including already corrected headers where pseudo one-bit error is corrected.

Step S18: When it is determined by the determination of step S14 that the BIP calculation value exceeds the threshold level, cells including a bit error in the header are discarded from among the cells in the cell buffer 22 and all remaining cells are allowed to pass.

Figure 13:
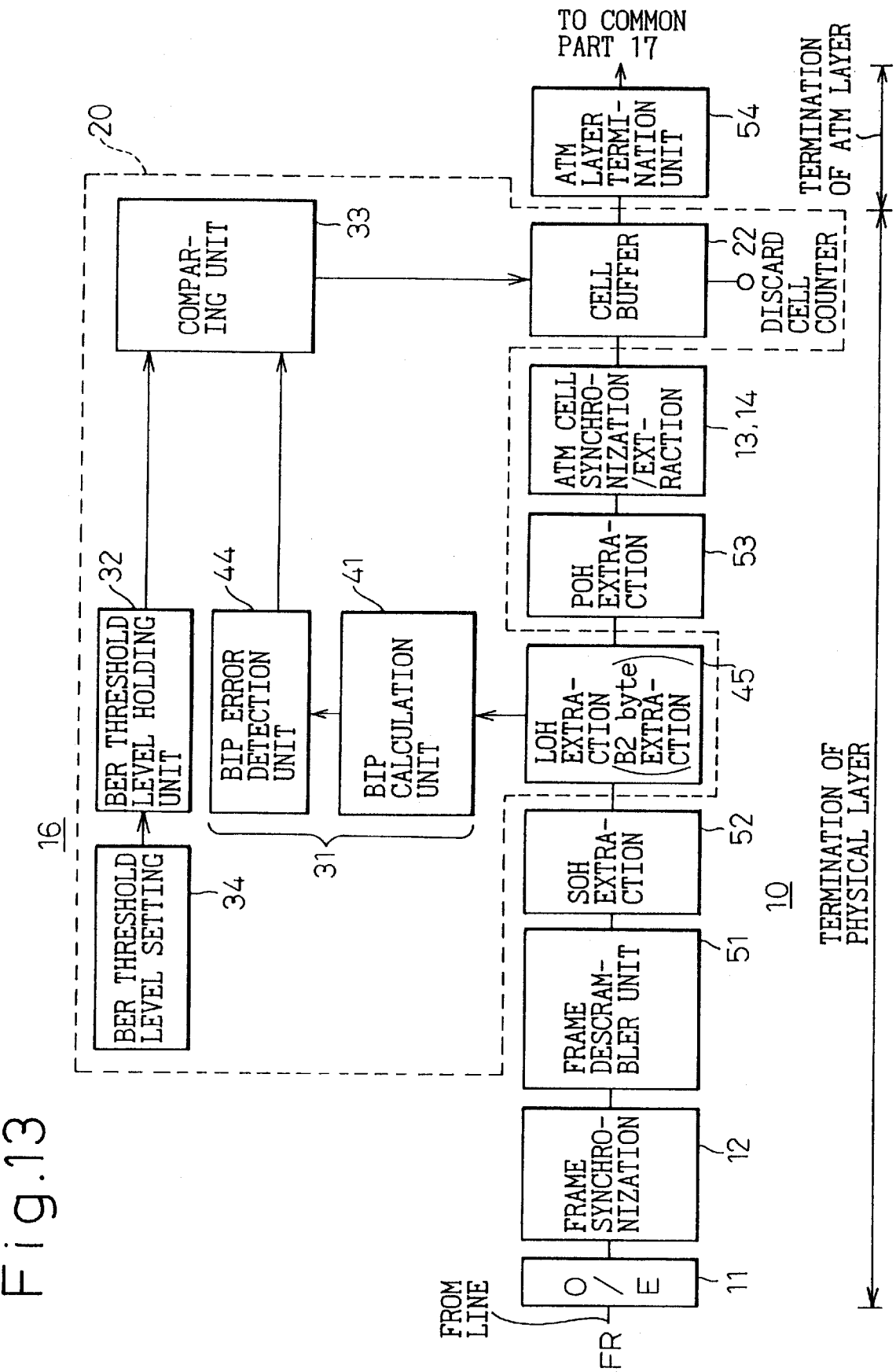
FIG. 13 is a view of an example of the actual configuration of an individual part 16 into which an apparatus for control of the transfer of transmission cells is incorporated according to the present invention.

FIG. 13 is a view of an example of the actual configuration of an individual part 16 into which the transfer control apparatus of transmission cells according to the present invention is incorporated.

The individual part 16 comprises a pass control apparatus 20 according to the present invention and a main body, i.e., cell processing apparatus 10, of the individual part 16. This main body (10) comprises the reception unit 11 (mainly comprising an optical/electrical (O/E) converting optical module), frame synchronization unit 12, and cell synchronization/extraction units 13 and 14 already shown in FIG. 2 and, at the same time, further has a frame descramble unit 51, section overhead (SOH) extraction unit 52, path overhead (POH) extraction unit 53, and ATM layer termination unit 54. Note that the line overhead (LOH) extraction unit 45 is drawn included in the pass control apparatus 20.

On the other hand, looking at the pass control apparatus 20, the BER monitoring unit 31, the threshold level holding unit 32 holding the threshold level of BER, the comparing unit 33, and the BIP calculation unit 41 already shown in FIG. 10 and FIG. 11 are shown. Further, 44 is a BIP error detection unit forming the BER detection unit.

The LOH extraction unit 45 extracts the B2 byte in the LOH region. The B2 byte is used for the BIP calculation in the BIP calculation unit 41. Note that, the BIP calculation per se is well known, but will be explained simply next.

In FIG. 13, the terminal (1 of FIG. 16) maps the cells in the SONET frame FR and simultaneously carries out the BIP calculation by using all data in the frame FR. The terminal stores the result of the calculation in a predetermined region in the frame FR and transmits it toward the individual part 16. In the individual part 16, the synchronization of the frame FR is established, the BIP calculation is carried out by using all these data, and simultaneously all cells in the frame are stored in the cell buffer 22. When assuming that deterioration (bit error) of the communication quality of the frame FR occurs, error is caused in the result of BIP calculation in the BIP calculation unit 41. When the BER of the calculation result exceeds a certain threshold level (for example $10^{-3}$), cells including a bit error in the header among the cell data stored in the cell buffer 22 are discarded unconditionally. If the result of the BIP calculation does not exceed the threshold level, the processing is carried out along with the usual mode transition (refer to FIG. 5).

In general, in the transmission of frames, the main method used for monitoring the bit error of the line is BIP calculation. This is a method of detecting the code error in the transmission frame of a frame signal from the transmission side (terminal 1) by inserting the result of the BIP calculation into the next frame (FR'), performing BIP calculation similarly with respect to the received frame FR at the reception side (individual part 16), and comparing this calculation result with the result, included in the frame FR', of the BIP calculation inserted at the transmission side. By this BIP calculation, when the BER exceeds a certain threshold level, all of the cells including a bit error in the header are discarded from this frame. By this, cells including multi-bit error or one-bit error are compulsorily discarded, and thus transmission, after erroneous correction, of the cell with erroneous header due to the erroneous recognition of one-bit error can be prevented. If BER does not exceed the threshold level, cells are passed through as they are. At this time, since each frame is judged, a cell buffer 22 storing one frame's worth of cells, for example, 30 cells, is necessary.

In the example, the threshold level of the BER was set to $10^{-3}$ for the following reason.

For example, in SONET, the lines are duplexed and an automatic protection switch (APS) protocol is defined for switching one line to another when a failure occurs on one line. As the factor for switching of lines at this time, various failures on the lines are defined. One of them is referred to as a signal failure (SF). This SF is defined as the case where the BER on the transmission line reaches $10^{-3}$ to $10^{-5}$ under the Bellcore requirements. In consideration with this, as the threshold level of the present invention, the values $10^{-3}$ to $10^{-5}$ can be set. For example, it is set to $10^{-3}$.

Finally, the BIP calculation will be simply explained.

Figure 14:
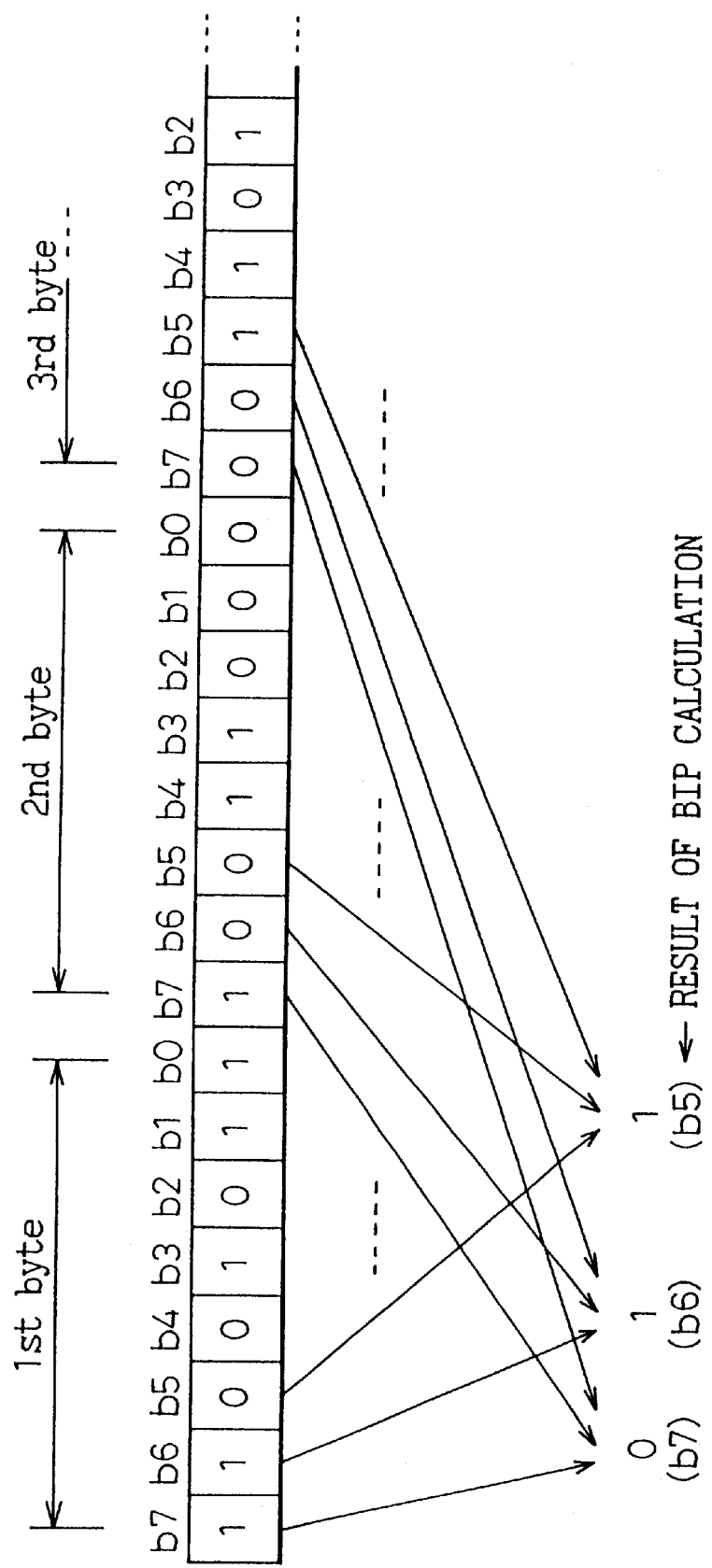
FIG. 14 is a view of one part of a series of frame groups used for explanation of a BIP calculation.
Figure 15:
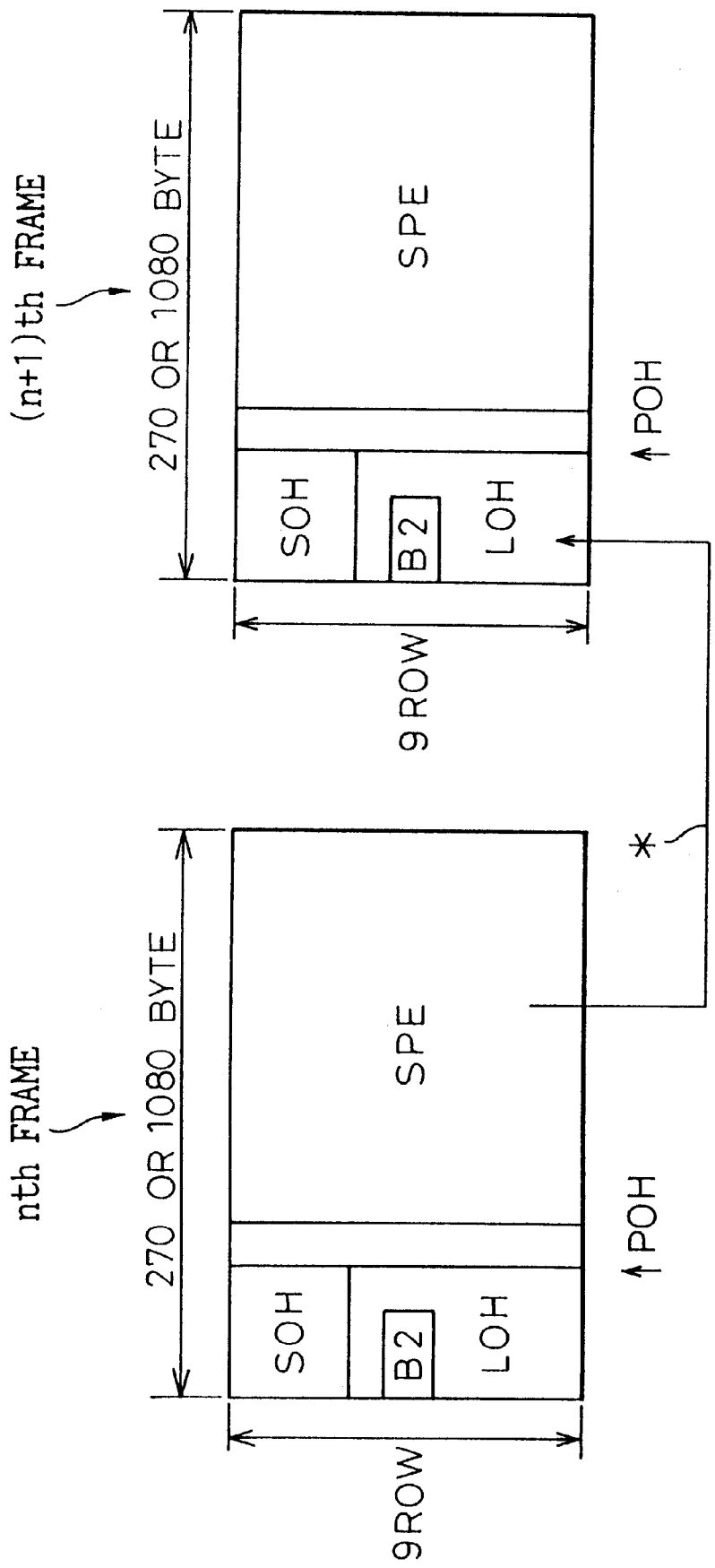
FIG. 15 is a view of a frame format comprised by the frame groups of FIG. 14.

FIG. 14 is a view of a part of a series of frame groups used for the explanation of the BIP calculation; and FIG. 15 is a view of a frame format comprised by the frame groups of FIG. 14. In the figure, a synchronous payload envelope (SPE) region is a region in which ATM cells etc. are mapped. Further, in FIG. 15, the correlation denoted by a line * is as follows:

[Transmission]

Insert the result of the BIP calculation of the n-th frame into the n+1-th frame.

[Reception]

Compare the result of the BIP calculation for the n-th frame with the n-th BIP calculation result inserted into the n+1-th frame.

First, on the transmission side, even parity is established by b7 of the 1st byte, b7 of the 2nd byte, and b7 of the 3rd byte (below, continued as 4th, 5th, 6th byte . . . ). This even parity is carried out for each frame (270 bytes as STM-1 of SDH, and 1080 bytes as STM-4), and the results thereof are treated as the results of the BIP calculation for b7. Similarly, even parity is established up to b0 such as b6 of the 1st byte, b6 of the 2nd byte, . . . , b5 of the 1st byte, b5 of 2nd byte, . . . . These are defined as the results of the BIP calculation for each bit (b7 to b0). This operation is repeatedly carried out for each frame. In this case, the result of the BIP calculation is cleared every time at the start of the frame. At the same time, this calculation result is inserted into the insertion byte (B2 byte mentioned above etc.) of the calculation result of the next frame.

On the reception side, in the same way as the transmission side, BIP calculation is carried out for each received frame, the result of this calculation and the calculation result (B2 byte, etc.) in the next frame are compared, and the bit error is detected. As a result, it is possible to detect a bit error up to 0 to 8 bits in one frame.

As explained in detail above, according to the present invention, it is possible to prevent erroneous recognition of one-bit error caused by particular multi-bit error occurred in the header of a cell and to prevent passes of the cells, after correction of this one-bit error, through a cell processing apparatus such as the individual part, whereby the line quality of the communication system can be improved.

While the invention has been described by reference to specific embodiments chosen for purposes of illustration, it should be apparent that numerous modifications could be made thereto by those skilled in the art without departing from the basic concept and scope of the invention.

What is claimed is:

1. A method of pass control of transmission cells for successively receiving frames each mapped with a plurality of cells partially including a synchronizing field at a cell processing apparatus, establishing frame synchronization, dealing with one-bit errors in the headers of the cells by correcting the bits, dealing with multi-bit errors of 2 bits or more by establishing synchronization of the cells while discarding cells, and passing cells extracted from the frames through the cell processing apparatus, comprising:

a first step of monitoring a communication quality of each frame of said successively received frames;

a second step of temporarily buffering the plurality of cells contained in each monitored frame, frame by frame;

a third step of determining whether or not the communication quality in bit error of bits comprising said monitored frame exceeds a predetermined threshold of a bit error level; and a fourth step of discarding only a cell or cells each including said one-bit error and/or multi-bit errors in said header from one frame's worth of the buffered cells when said communication quality deteriorates exceeding said threshold bit error level and thus prohibiting said discarded cell or cells from passing through said cell processing apparatus, while, when said communication quality does not exceed said threshold bit error level, discarding only a cell or cells each including said multi-bit errors from said one frame's worth of the buffered cells and thus passing the remaining buffered cells through said cell processing apparatus.

2. A method of pass control of transmission cells as set forth in claim 1, wherein said synchronizing field is an HEC (header error control) field mapped in the header of said cells.

3. A method of pass control of transmission cells as set forth in claim 1, wherein the monitoring of the communication quality of said frame in said first step is carried out by monitoring a BER (bit error rate).

4. A method of pass control of transmission cells as set forth in claim 3, wherein the monitoring of said BER (bit error rate) is carried out by using a calculation result of a BIP (bit interleaved parity) calculation.

5. A method of pass control of transmission cells as set forth in claim 1, wherein said cell processing apparatus is an individual part functioning for termination of a physical layer in an ATM exchange.

6. An apparatus for pass control of transmission cells added to a cell processing apparatus, having a reception unit for successively receiving frames from transmitted from lines, a frame synchronization unit for establishing frame synchronization unit of the received frames, a cell synchronization unit for said cells mapped in the frames after establishing the frame synchronization while detecting the bit error and correcting the same and a cell extraction unit for extracting cells after establishing cell synchronization, comprising:

a cell buffer which is connected to the latter stage of said cell extraction unit and temporarily stores for each frame a one frame's worth of cells contained in each said frame, and a frame monitoring means connected to said frame synchronization unit for monitoring the communication quality of each said frame; wherein when it is determined by said frame monitoring means that the communication quality of said frame deteriorates exceeding the predetermined threshold level, all of the cells including said bit error are discarded from said cell buffer.

7. An apparatus for pass control of transmission cells as set forth in claim 6, wherein each said cell includes the HEC (header error control) field mapped in the header and this HEC is used to detect whether or not each said header includes a bit error.

8. An apparatus for pass control of transmission cells as set forth in claim 6, wherein said frame monitoring means includes a BER monitoring unit for monitoring the BER (bit error rate) of each said frame.

9. An apparatus for pass control of transmission cells as set forth in claim 8, wherein said BER monitoring unit is a BIP calculation unit for executing a BIP (bit interleaved parity) calculation.

10. An apparatus for pass control of transmission cells as set forth in claim 8, wherein said frame monitoring means includes a threshold value holding unit for holding a predetermined threshold level of said BER.

11. An apparatus for pass control of transmission cells as set forth in claim 10, wherein said frame monitoring means includes a comparing unit for comparing the BER value monitored by said BER monitoring unit with the threshold level held in said threshold level holding unit; and when the BER value deteriorates exceeding the threshold level, all of the cells including said bit error are discarded from said cell buffer.

* * * * *